May 26, 1959  L. J. HERSH  2,888,188
CENTRIFUGAL FLUID PUMP
Filed Dec. 3, 1956  2 Sheets-Sheet 1
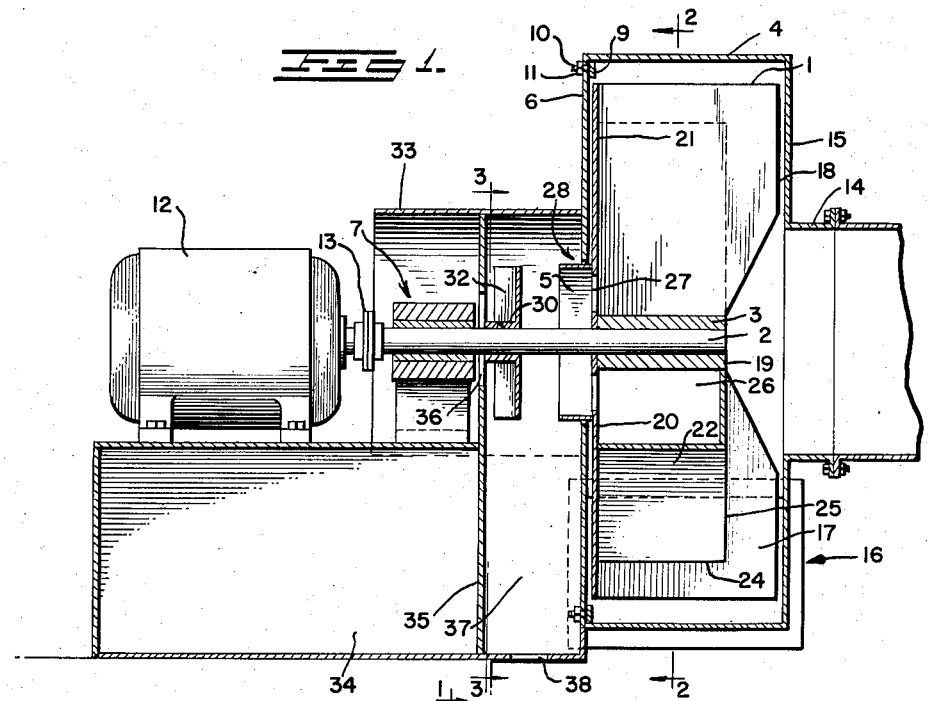
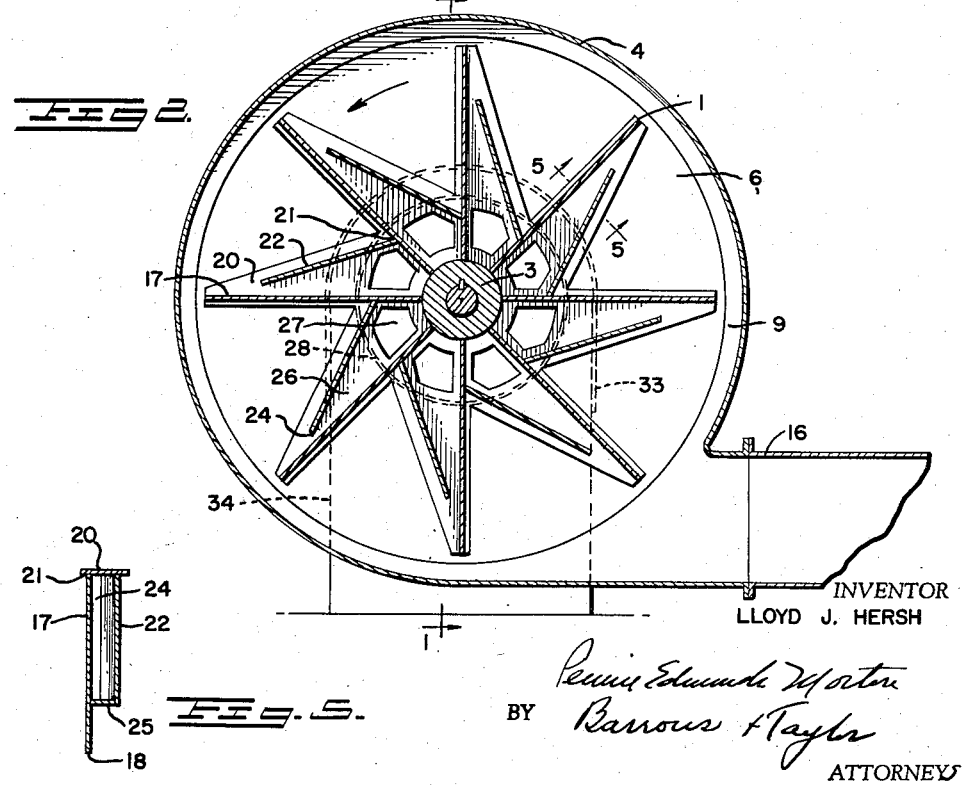
INVENTOR
LLOYD J. HERSH
ATTORNEYS May 26, 1959  L. J. HERSH  2,888,188
CENTRIFUGAL FLUID PUMP
Filed Dec. 3, 1956  2 Sheets-Sheet 2
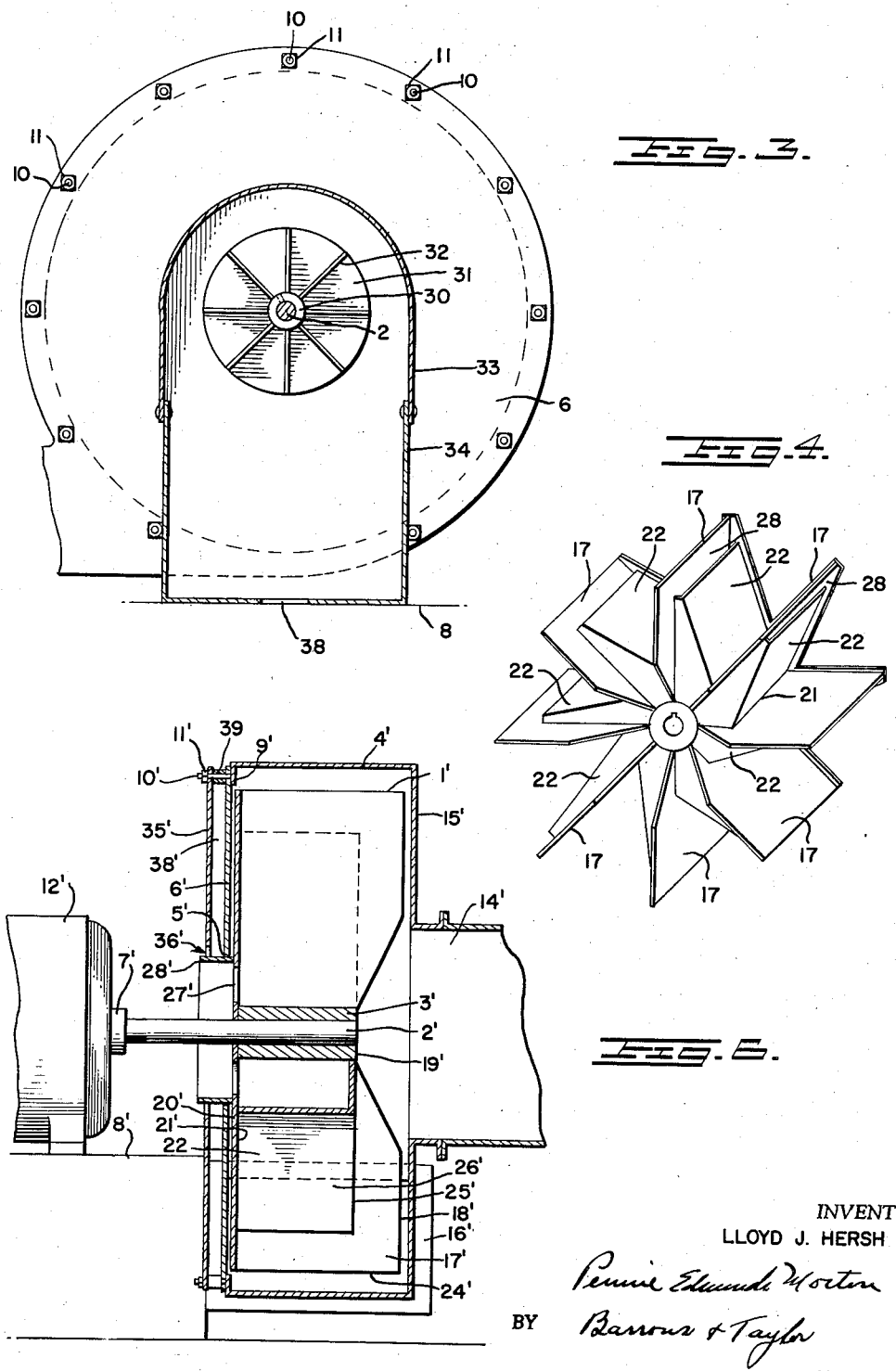
INVENTOR
LLOYD J. HERSH
BY
ATTORNEYS

United States Patent Office 2,888,188
Patented May 26, 1959

2,888,188

CENTRIFUGAL FLUID PUMP

Lloyd J. Hersh, Allentown, Pa., assignor to Fuller Company

Application December 3, 1956, Serial No. 626,044

15 Claims. (Cl. 230—47)

This invention relates to centrifugal fluid pumps, and is more particularly concerned with centrifugal fans for moving hot gases.

In high temperature services such as with induced draft furnaces, incinerators, steam boilers, etc., hot gases being moved by fans deliver a portion of their heat to the members composing the fan, including the fan wheel, the casing, and such areas of the shaft and fan wheel hub as may be exposed to the gases.

If the temperature of the hot gases being moved is relatively steady, and not excessively greater than atmospheric temperature, an equilibrium may be established between the hot gases, the fan members, the fan accessories such as the shaft bearing and driving motor, and the immediate atmosphere, in which the temperatures of the fan members and accessories are maintained within safe limits. However, at gas temperatures which are excessive relative to the temperature limits of the materials of construction, and the several rates of heat transfer and discharge, the equilibrium temperature or normal operating temperature of a part or parts of the fan may require special designs and provisions to accommodate the heat.

In the case of close-fitting moving parts such as bearings, when exposed to excessive heat, the designed clearances between the parts may be consumed by thermal expansion of the parts, resulting in seizure of the mechanism. In electric motors, not only the bearings are vulnerable, but the wiring insulation also may be ruined.

The designs resorted to for the protection of motors and bearings in high temperature service have included water-cooling of bearings, radiation shields, and hollow or perforated shafts and blades which are cooled by passage of air through the hollows or perforations. Protection of the structural qualities of the basic fan members has generally been in the form of costly metal alloys, precooling of the gases prior to entering the fan, and the delivery of cool air through a hollow shaft and/or hollow hub and, subsequently, through hollow and ported blade members. However, none of these provisions have been entirely satisfactory.

The present invention utilizes a solid shaft and hub, and solid blades, thereby obtaining the maximum strength inherent in the design and eliminating the excessive diameters required by hollow shafts and hubs, and provides for the cooling of the fan members to reduce the rate of heat transfer toward the bearing, especially by conduction through the shaft.

This invention also provides an unobstructed, radially and outwardly narrowing channel for cooling air to travel along a surface of each blade, increasing in velocity and velocity pressure as it travels radially, and discharging near the tip of the blade into the hot gases within the fan casing.

Furthermore, means for controlling the volume of cooling air may be provided so that an excess, which in some cases may adversely affect the fan efficiency, or a subsequent process if the gas is recirculated or used further, may be avoided, and an optimum balance of gas and air flows may be established.

This invention is directed to the protection of centrifugal fluid pumps from the heat of fluids handled thereby through the introduction of a cooling fluid within the impeller for subsequent discharge into the hot fluid. The cooling fluid is delivered along the outer surfaces of the impeller shaft and hub and is driven radially and outwardly by the centrifugal action of channels, which are preferably located at the rear of the impeller. The channels are radially and outwardly narrowing in cross-section, thereby increasing the velocity and pressure of the cooling fluid as it progresses through the channels. In this manner, the resistances to flow of the cooling fluid are overcome to provide an adequate rate of flow through the channel, and the rate of heat transfer between the impeller and the cooling fluid is improved, while the cooling fluid is discharged from the channels at a point within the generatrix of the impeller tips. Hence the tips may be designed to accommodate other requirements of the installation.

The invention will be further described in connection with the accompanying drawings which illustrate preferred embodiments of the invention.

In the drawings:

Fig. 1 is a side elevation, partly in section on line 1—1 of Fig. 2, of a centrifugal fan embodying the invention;

Fig. 2 is a sectional view on line 2—2 of Fig. 1;

Fig. 3 is a sectional view on line 3—3 of Fig. 1;

Fig. 4 is a perspective view of the fan wheel of Fig. 1;

Fig. 5 is a sectional view on line 5—5 of Fig. 2; and

Fig. 6 is a side elevation, partly in section, of a centrifugal fan embodying a modified form of the invention.

In the drawings, the invention is shown embodied in a centrifugal fan and, as shown in Fig. 1, a fan wheel 1 is carried on a shaft 2 by a hub 3, and is mounted within a casing 4. Shaft 2 extends through a circular opening 5 in a backing plate 6 of casing 4 and is supported by a bearing 7, mounted on a base 8. Backing plate 6 is secured to a peripheral flange 9 of casing 4, by means of a plurality of studs 10 extending from flange 9 and threaded to receive nuts 11. Also mounted on base 8 is a motor 12 engaging shaft 2 by means of a coupling 13.

Casing 4 is provided with a hot gas inlet 14 in a sidewall 15 generally opposite the circular opening 5, and with a typical centrifugal fan outlet 16.

Hub 3 carries a plurality of radial main blades 17 whose width extends across the greater part of the distance between backing plate 6 and sidewall 15 according to known design. The edges 18 of blades 17 which are adjacent sidewall 15 recede from the sidewall 15, beginning at the periphery of hot gas inlet 14, toward the hub end 19 in a conventional manner.

A spider wall 20 extends radially from hub 3, and generally parallel to backing plate 6, along the edge 21 of each blade 17 adjacent the backing plate 6, and is joined to the hub and to the blade edges 21. The spider wall 20 may be constructed of a single sheet, as shown, or may take the form of individual welded walls, between the blades and the hub, which are arranged in substantially the same plane and thereby form a continuous plane at the blade edges 18.

Each blade 17 carries a secondary blade 22 on its forward rotational face, with the secondary blade 22 joining the blade 17 at a line or juncture 23 which is spaced from the hub 3. Each secondary blade 22 extends both outwardly with respect to the hub, and forward with respect to the direction of rotation. The angle formed by the secondary blades 22 with the blades 17 at their juncture 23 is such that a projected plane of each secondary blade 22 intersects the rotationally preceding blade 17 a short distance from the tip thereof. The outer end of the secondary blade itself, however, terminates short of the surface of the rotationally preceding blade 17, forming a slot or port 24 therebetween.

Each secondary blade 22 is joined, along one edge, to the spider wall 20, and along the other edge, to an individual closing wall 25. The closing walls 25 are arranged generally perpendicular to the axis of hub 3 and on substantially the same plane as hub end 19, thereby completing channelways or channels 26 between the blades 17, spider wall 20, and secondary blades 22.

The spider wall 20 is provided with a plurality of ports 27, each of which communicates with one of the channels 26. A collar or ring 28 is secured to spider wall 20, extending through circular opening 5 in backing plate 6 and encompasses the several ports 27 which thereby provide direct communication of the interior of ring 28 with the interiors of the channels 26. The exterior surface of ring 28 forms a close, running fit with the edge of circular opening 5 in backing plate 6 to prevent leakage of air or gas therebetween.

The shaft 2 carries a heat dissipator 29, mounted thereon by lock collar 30 and spaced from ring 28. Dissipator 29 preferably consists of a disc 31, which is substantially equal in diameter to the diameter of ring 28. The disc 31 carries outwardly-extending radial blades 32, which function both as an air-dispersing fan and as heat dissipating fins. The blades 32 are secured by one of their edges to disc 31, on the side thereof remote from ring 28.

The distance between disc 31 and ring 28 may be varied by axial movement of the disc, through relocation of the lock collar 30. This adjustment will modify the dimensions and, consequently, the air flow capacity of the annular opening between the disc and the ring.

A hood 33 extends as an arch along the sides 34 of base 8, from the junction of the sides 34 with backing plate 6 to a point beyond the bearing 7, confining the ring 28, dissipator 29, and bearing 7.

Across the interior of hood 33 and between the sides 34 of base 8, in the region between bearing 7 and dissipator 29, a radiation shield 35 is arranged, and extends to the lowest region of base 8. Radiation shield 35 is provided with an orifice 36 for passage of shaft 2 and air therethrough. The diameter of orifice 36 is preferably sufficiently large to ensure an annular air intake orifice of adequate size around the shaft, but not larger than the diameter of disc 31. With this arrangement, a full cross-sectional barrier to the passage of radiant heat to the bearing 7 and motor 12 is provided, while permitting passage of air over these members and through intake orifice 36.

The radiation shield 35, the backing plate 6, the portions of sides 34 between the shield 35 and backing plate 6, and the hood 33 form a housing 37 which is closed except for intake orifice 36 and an aperture 38 in the lower region of the housing 37 beyond the periphery of the casing 4. The housing 37 receives air through of the intake orifice 36, and either receives or discharges a lesser amount of air through aperture 38. This lesser flow serves to reduce the transmission of heat through housing 37 and sides 34 to the bearing 7 and motor 12. It is also contemplated that housing 37 may include the full area of backing plate 6, with a correspondingly sized radiation shield 35, in which case aperture 38 may take the form of a peripheral slot or series of apertures.

In operation of the apparatus of Fig. 1, fan wheel 1 is rotated by motor 12 in the direction shown in Fig. 2. The centrifugal force imparted to the gas by the motion of blades 17 draws hot gas through hot gas inlet 14 and discharges it through outlet 16 in a known manner.

The simultaneous rotation of secondary blades 21 draws air through ports 27 and into the channels 26, to be discharged through discharge ports 24. The group of secondary blades 2 forms a forward-curve fan, since their planes slope forward in the direction of rotation. Forward-curve fans are known to have higher pressures and capacities in comparison with straight-bladed or steel plate fans of the same wheel diameter when driven at identical speeds. The provision of a forward-curve blade, with its higher pressure characteristic, makes it possible to use a smaller diameter secondary wheel, while still developing adequate pressure to ensure a flow of cool air against the resistance of the pressure existing in the periphery of the fan, without providing an external fan to force the air therethrough.

The smaller diameter required for the secondary blades makes it possible to terminate their tips short of the tips of the main blades. Therefore, the tips of the main blades may be designed as forward- or rearward-curve blades to suit the requirements of the general installation, rather than being limited to the straight blade form.

The radially and outwardly decreasing cross-section of the channels effects a distribution of the air within the channel by progressive confinement of the air against the inner surfaces. This narrowing cross-section also increases the rate of acceleration of the air within the channel beyond what might occur if only centrifugal force and gaseous thermal expansion were effective for such acceleration.

Furthermore, the provision of an increasing velocity of the cooling air by decreasing the cross-sectional area of the channels affords a higher rate of heat transfer from the channel walls to the cooling air. In the transfer of heat from conduits to fluids, extremely thin films of fluid frequently are formed adjacent the conduit walls. These films move more slowly because of the friction exhibited by the walls. In the case of air in particular, the thin film acts as an insulation between the wall and the main air stream. With the high velocity of cooling air and an increased angle of incidence of the air against the walls of the channelways, the films of air adjacent the walls are continuously wiped away, presenting cooler gas to those surfaces, and providing a higher rate of heat transfer to the cooling air.

The elevated total pressure of the cooling air within the channels serves to ensure the discharge of high rates of cooling air flow into the fan chamber against the peripheral pressure of the hot gases produced in the casing by the fan blades. In view of this developed pressure, the actual discharge port of the cooling air channel may be located at a sufficient distance from the blade tips to enable the blades to be formed as ordinary sheet units having either straight tips or forward- or rearward-curve tips according to the performance characteristics desired.

The air passing through channels 26 cools the associated surfaces of the hub and blades, thereby reducing the rate of heat conduction along the shaft toward the bearing. In addition, the passage of the cooling air in sequence over the members on the shaft, and along the surface of the shaft itself, before such air enters the channels, provides for the removal of heat therefrom, so that even the lowered rate of heat transfer from the fan cannot adversely affect the bearing and motor.

Preferably the major portion of cooling air is drawn into the cooling air supply ports 27 through air intake orifice 36, whereby it passes and contacts bearing 7, shaft 2, radiation shield 35, blades 32, and disc 31, successively, before entering ring 28 and ports 27. However, a small flow of air through aperture 38 and through housing 37 is effective in preventing a build-up of heat in base 8, which might affect the bearing and motor mounted thereon.

With the control of residual heat by the cooling air and the radiation barrier formed by radiation shield 35 and dissipator 29, and particularly because of the constant, positive cooling of the fan wheel hub to inhibit the conduction of heat therefrom through the shaft, the motor and bearing may be standard service units, directly connected, without the special designs and fabrication frequently employed, even though the temperature of the gases is such that a unit without these provisions would be rendered inoperable by excess heat.

In Fig. 6, the same numerals, primed, are used to identify members similar to those shown in Fig. 1. In this form of the invention, there is shown an alternate arrangement for generally less critical conditions than the fan of Fig. 1. The shaft 2' of a motor 12' is extended to enter a fan casing 4' and carry a fan wheel 1'. A backing plate 6' is secured to flange 9' of casing 4' by studs 10', which also carry individual spacers 39 for spacing a radiation shield 35' from backing plate 6', with the assembly secured on studs 10' by nuts 11'.

Backing plate 6' and radiation shield 35' have apertures 5' and orifice 36' respectively therein, for receiving a ring 28' therethrough. Aperture 5' forms a close running fit with the outer surface of ring 28' to prevent leakage of gas therebetween. Orifice 36' is slightly larger in diameter than the outer surface of ring 28' so that a small flow of air may pass therethrough and through peripheral apertures 38' between studs 10', whereby radiation shield 35' is further cooled.

In the operation of the apparatus of Fig. 6, hot gases are drawn through hot gas inlet 14' and discharged at outlet 16', and cooling air is drawn in through ring 28', ports 27', and after passing through channels 26', is discharged at discharge ports 24' to join the hot gases, as described in conjunction with Fig. 1. However, the cool air is drawn past motor 12' and motor shaft 2', without passing a dissipator or other means, and enters the ring 28' and ports 27' directly. The relatively small flow of cooling air between backing plate 6' and radiation shield 35' through apertures 38' and orifice 36' acts as a barrier against heat transmission, and further protects motor 12' from fan heat by cooling radiation shield 35'.

This form of the invention is particularly advantageous in services wherein a possible excess of cool air, over that required for adequate cooling, is not detrimental to the process or economical operation, so that the fan may operate with its inherent maximum rate of cooling air flow, without throttling of its air supply.

The structural effect of secondary blades 22 and 22', spider wall 20 and 20' and closing walls 25 and 25' of both Fig. 1 and Fig. 6, which are also cooled by the air, is that of reinforcing each blade by trussing each blade's rearward rotational face to the forward rotational face of its rotationally succeeding blade, as well as providing for the flow of cool air through the apparatus. Therefore, the provision of the cooling means of this invention serves to improve the structural strength of the fan wheel mechanically, as well as to maintain the structural qualities of the materials by a cooling thereof.

Further provisions may be made for cooling the fan members and/or the hot gases being moved, such as introducing dispersed liquids into the cooling air stream to be vaporized by the heat of the fan or hot gas. These provisions may also serve a purpose of humidifying the gases or for blending gases or gases and vapors, as desired.

It will be understood that various changes may be made in the details of the apparatus or method of operation without departing from the spirit of the invention or sacrificing any of the advantages thereof.

I claim:

1. An impeller for a centrifugal fluid pump comprising a rotor including a hub and a plurality of main blades secured thereto and extending outwardly substantially to the peripheral edge of the impeller, a driving shaft, said rotor hub being mounted on said driving shaft, a channelway at the rotationally-following side of each of said blades, said channelways extending along said blades and terminating inwardly from the radially outer portion of said blades, each of said blades forming one sidewall of its adjacent channelway, said channelways each having a fluid inlet opening through a side thereof outwardly from but adjacent the hub and a fluid outlet opening adjacent its radially outer end, a plurality of secondary blades, said secondary blades each forming an opposite sidewall of one of the said channelways and sloping rotationally forwardly toward the preceding main blade, the inner end of said secondary blades being adjacent the hub and their outer ends being located inwardly from the peripheral edge of the main blades and defining the outer ends of said channelways, whereby when said rotor is rotated, fluid is caused to pass through said channelways and be discharged through said outlet openings of said channelways.

2. An impeller for a centrifugal fluid pump or the like as set forth in claim 1 in which the blades extend in a substantially radial direction from the hub.

3. An impeller for a centrifugal fluid pump as set forth in claim 1 in which a wall extends substantially perpendicularly to the axis of the hub and is secured to the blades at one side thereof and forms a third wall of the respective channelways, and the fluid inlet openings to said channelways are formed in said wall.

4. An impeller for a centrifugal fluid pump as set forth in claim 1 in which said secondary blades are secured to the next rotationally succeeding main blades.

5. An impeller for a centrifugal fluid pump as set forth in claim 4 in which the secondary blades are secured to the next rotationally succeeding main blades at a distance from the hub and the portions of said succeeding main blades between the rotor hub and the place of securement of said secondary blades thereto form walls of said channelways, whereby the rotationally forwardly sloping secondary blades form a structural support.

6. A centrifugal fluid pump comprising a casing having a fluid inlet and a fluid outlet, a rotor including a hub and a plurality of main blades secured thereto and extending continuously outwardly to their peripheral edges, a driving shaft, said rotor hub being mounted on said driving shaft, a channelway at the rotationally-following side of each of said blades, said channelways extending along said blades and terminating inwardly from the radially outer portion of said blades, each of said blades forming one sidewall of its adjacent channelway, said channelways each having an axial fluid inlet opening at a side thereof outwardly from but adjacent the hub and a fluid outlet opening adjacent its radially outer end, a plurality of secondary blades, said secondary blades each forming an opposite sidewall of one of said channelways and sloping rotationally forwardly toward the preceding main blade, the inner end of said secondary blades being adjacent to the hub and the outer ends being located inwardly of the main blades and defining the outer ends of said channelways, said casing having a circular aperture axially opposite the fluid inlet thereof, said rotor having a circular projection mounted thereon for rotation therewith, said circular projection surrounding at least one of said axial fluid inlet openings and extending into said circular aperture, whereby when said rotor is rotated, fluid from a second source is caused to pass through said circular projection, said axial fluid inlet openings, said channelways, and said fluid outlet openings of said channelways.

7. A centrifugal fluid pump as set forth in claim 6 in which the circular projection extends into said circular aperture in close relation with the periphery thereof, so that a partial seal is formed against leakage of fluid therebetween.

8. A centrifugal fluid pump as set forth in claim 6 in which the fluid inlet openings to said channelways are arranged in a circular series and said circular projection surrounds the series.

9. A centrifugal fluid pump comprising a casing having a fluid inlet and a fluid outlet, a rotor including a hub and a plurality of blades secured thereto, a driving shaft, said rotor hub being mounted on said driving shaft, a channelway at one side of each of said blades, said channelways extending along said blades and terminating adjacent the radially outer portion of said blades, each of said blades forming one sidewall of its adjacent channelway, said channelways each having an axial fluid inlet opening adjacent the hub and a fluid outlet opening adjacent its radially-outer end, opposite sidewalls of said channelways converging outwardly, said casing having a circular aperture axially opposite the fluid inlet thereof, said rotor having a circular projection mounted thereon for rotation therewith, said circular projection extending into said circular aperture and surrounding said driving shaft and the axial fluid inlet openings and being concentric with the driving shaft, whereby when said rotor is rotated fluid from a second source is caused to pass through said circular projection, said axial fluid inlet openings, said channelways and said fluid outlet openings of said channelways, a radiation barrier adjacent the casing wall having said circular aperture therein, said radiation barrier having an aperture therein, said circular projection being smaller than the aperture in said radiation barrier and extending therethrough, said radiation barrier being spaced from said casing wall, and the space between said radiation barrier and said casing being open to the surrounding atmosphere adjacent the periphery of the barrier, whereby a fluid may flow between said barrier and said casing wall.

10. A centrifugal fluid pump comprising a casing having a fluid inlet and a fluid outlet, a rotor including a hub and a plurality of blades secured thereto, a driving shaft, said rotor hub being mounted on said driving shaft, a channelway at one side of each of said blades, said channelways extending along said blades and terminating adjacent the radially outer portion of said blades, each of said blades forming one sidewall of its adjacent channelway, said channelways each having an axial fluid inlet opening adjacent the hub and a fluid outlet opening adjacent its radially-outer end, opposite sidewalls of said channelways converging outwardly, said casing having a circular aperture axially opposite the fluid inlet thereof, said rotor having a circular projection mounted thereon for rotation therewith, said circular projection extending into said circular aperture and surrounding said driving shaft and the axial fluid inlet openings and being concentric with the driving shaft, whereby when said rotor is rotated fluid from a second source is caused to pass through said circular projection, said axial fluid inlet openings of said channelways and said outlet openings of said channelways, and a heat dissipater surrounding said driving shaft, said heat dissipater being axially spaced from the outer axial end of said circular projection.

11. A centrifugal fluid pump as set forth in claim 10 in which the heat dissipator is mounted on the driving shaft for rotation therewith.

12. A centrifugal fluid pump as set forth in claim 10 having means for axial displacement of said heat dissipator along said shaft whereby the distance between said heat dissipator and said circular projection may be regulated.

13. A centrifugal fluid pump as set forth in claim 11 in which the heat dissipator comprises a plate and a plurality of blades extending outwardly in a direction away from the driving shaft.

14. A centrifugal fluid pump as set forth in claim 10 in which an endwall is spaced from a casing wall at the side of said heat dissipator remote from said casing wall, and a hood extends about said heat dissipator, said circular projection and between said casing wall and endwall to form a housing therewith, said hood having at least one aperture therein, said endwall having an orifice therein opposite said heat dissipator, the diameter of said orifice being smaller than the diameter of said heat dissipator, whereby a fluid may be caused to flow through said housing and said axial fluid inlet openings.

15. A centrifugal fluid pump as set forth in claim 14 in which blades are provided on said heat dissipator on the side thereof remote from said circular projection, whereby a fluid entering said housing through said orifice in said endwall is dispersed radially from said heat dissipator and absorbs heat therefrom.

References Cited in the file of this patent

UNITED STATES PATENTS

| | | |
|---|---|---|
| 523,935 | Harrison | July 31, 1894 |
| 2,519,473 | Jack et al. | Aug. 22, 1950 |

FOREIGN PATENTS

| | | |
|---|---|---|
| 157,411 | Switzerland | Dec. 16, 1932 |
| 214,801 | Germany | Oct. 20, 1909 |

UNITED STATES PATENT OFFICE
CERTIFICATE OF CORRECTION

Patent No. 2,888,188                                            May 26, 1959

Lloyd J. Hersh

It is hereby certified that error appears in the printed specification of the above numbered patent requiring correction and that the said Letters Patent should read as corrected below.

Column 3, line 73, for "blades 2" read -- blades 22 --; column 8, line 2, for "openings of said" read -- openings, said --; same line 2, before "outlet" insert -- fluid --.

Signed and sealed this 8th day of December 1959.

(SEAL)
Attest:
KARL H. AXLINE
Attesting Officer

ROBERT C. WATSON
Commissioner of Patents